United States Patent [19]

Chikama

[11] 4,209,228
[45] Jun. 24, 1980

[54] PRESSURE-LIGHT ENDOSCOPE

[75] Inventor: Toshio Chikama, Tokyo, Japan

[73] Assignee: Machida Endoscope Co., Ltd., Tokyo, Japan

[21] Appl. No.: 938,419

[22] Filed: Aug. 31, 1978

[30] Foreign Application Priority Data

Sep. 28, 1977 [JP] Japan .......................... 52-129286[U]

[51] Int. Cl.² .............................................. G02B 5/17
[52] U.S. Cl. ................. 350/96.26; 350/96.23; 350/96.32
[58] Field of Search ............... 350/96.23, 96.26, 96.32, 350/179

[56] References Cited

U.S. PATENT DOCUMENTS

| 3,498,695 | 3/1970 | Brouwer | 350/179 |
| 3,788,730 | 1/1974 | Greenleaf | 350/179 |
| 3,841,764 | 10/1974 | Snell et al. | 350/96.26 |
| 3,843,865 | 10/1974 | Nath | 350/96.34 |

Primary Examiner—Stewart J. Levy
Attorney, Agent, or Firm—Peter L. Berger

[57] ABSTRACT

The present invention discloses a construction of a pressure-tight endoscope for observing a high-pressure place. The construction aims at balancing the inner and exterior pressures of the hermetic endoscope through letting in the high-pressure which bears on the exterior of the endoscope into the inner side of it through an aperture which is provided on a cover. The high-pressure also may enter through a bellows which is attached to the aperture, or from the bellows and a pipe which transmits the high-pressure on a tip portion of the endoscope to the rearward portion. In this way, the present invention prevents deformation of the endoscope due to high-pressure, or breakage of a hermetic construction, or difficulty of operation of a flexible sheath.

4 Claims, 4 Drawing Figures

PRESSURE-LIGHT ENDOSCOPE

BACKGROUND OF THE INVENTION

A. Field of the Invention

The present invention relates generally to an endoscope for industrial use, or more particularly, to a pressure-tight endoscope for observing a high-pressure place.

B. Description of the Prior Art

An endoscope is generally used for observing a body cavity through illuminating an object and leading an image of it to an eyepiece in a grip portion of fiber-optic bundles or a lens system. Nowadays, such an endoscope is also utilized for an industrial service, for example, for examining the inner side of a high-pressurized gas tank.

By the way, the endoscope is made hermetic in order to prevent gathering of rust by moisture at the inner side of it when it is not used. Such an hermetic endoscope may, when it is inserted into a high-pressure place, easily may be deformed by the high-pressure there, or the hermetic construction may be broken, for example, such as an adhered portion of an observing window. Further, the operativeness of the flexible sheath may become difficult.

SUMMARY OF THE INVENTION

The present invention aims at providing a construction of a pressure-tight endoscope for observing a high-pressure place.

The above-said construction balances the inner and exterior pressure of the hermetic endoscope through letting in to the inner side of the endoscope the high-pressure which bears on the exterior of the endoscope through an aperture.

The first object of the present invention is to prevent the deformation of the endoscope under the influence of the high-pressure.

The second object of the invention is to protect the hermetic construction such as an adhered portion of an observing window.

The third object is to prevent difficulties in operating the flexible sheath due to the high-pressure.

The above and further objects and novel features of the invention will more fully appear from the following detailed description when the same is read in connection with the accompanying drawings. It is to be expressly understood, however, that the drawings are for purpose of illustration only and are not intended as a definition of the invention.

DETAILED DESCRIPTION OF PREFERRED EMBODIMENTS

The embodiments of the present invention are now described with reference to FIGS. 1 to 4.

Figure 1:
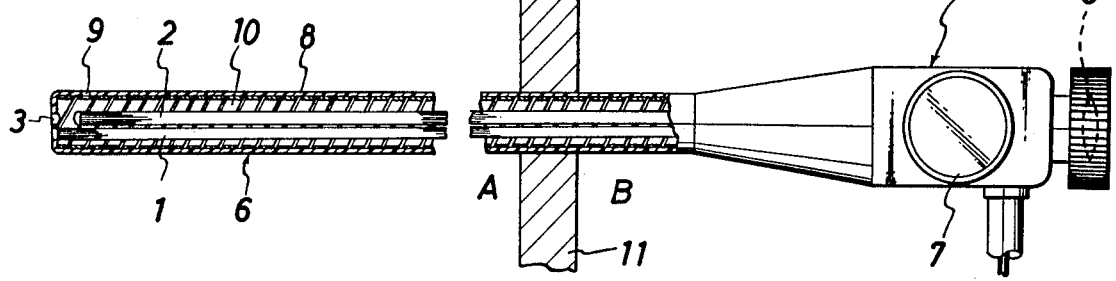
FIG. 1 is a cross-sectional view of a pressure-tight endoscope according to an embodiment of the present invention.

In FIG. 1, numeral 1 indicates light-transmitting optic bundles for illuminating an object with a light from a light source not shown. Numeral 2 indicates image-transmitting optic bundles for leading an image of the object from an observing window 3 to an eyepiece 5. Numeral 6 indicates a flexible sheath which contains the image-transmitting optic bundles 2 or so on and the flexible sheath 6 is bent at will by an angle deflector dial 7 of the grip portion 4 via an angle wire. The flexible sheath 6 is made hermetic by, for example, a cover 8 and also the observing window 3 is made hermetic by adhesives. In such a hermetic endoscope, numeral 9 indicates an aperture which is provided on a suitable point on the cover 8 and it makes an air communication between an inner portion 10 of the endoscope and the exterior portion. Numberal 11 indicates a wall of a high-pressurized gas tank to be observed, (A) side is a high-pressure place and (B) side is the atmosphere. This embodiment is applicable when the high-pressure place (A) is not filled with a liquid or a malignant gas. The inner and exterior pressure can be balanced through letting the pressurized gas through the aperture 9 directly into the inner side 10. In this way, the deformation of the endoscope due to high-pressure or a breakage of the hermetic construction or difficulties in operating the flexible sheath 6 can be prevented. When the endoscope is not used, the aperture 9 may be closed by a cap for keeping a hermetic construction of the inner side 10.

Figure 2:
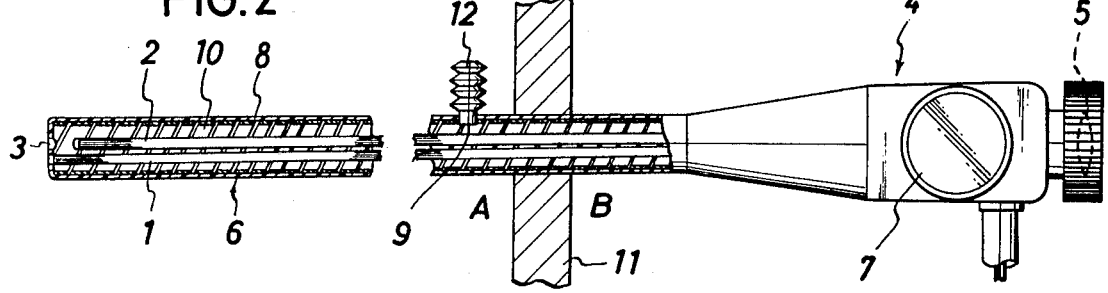
FIG. 2 is a cross-sectional view of a pressure-tight endoscope according to another embodiment of the present invention.

FIG. 2 shows another embodiment of the invention. A bellows 12 which is flexible as well as hermetic is attached to the aperture 9 of FIG. 1. This embodiment is applicable even if the high-pressure place (A) is filled with a liquid or a malignant gas. The bellows 12 is more flexible than the cover 8 when the high-pressure is applied, accordingly, air in the bellows 12 flows into the inner side 10 via the aperture 9. The cover 8 is pressed toward the outside and, consequently, the inner and exterior pressure is balanced. For this reason, deformation of the endoscope is prevented.

Figure 3:
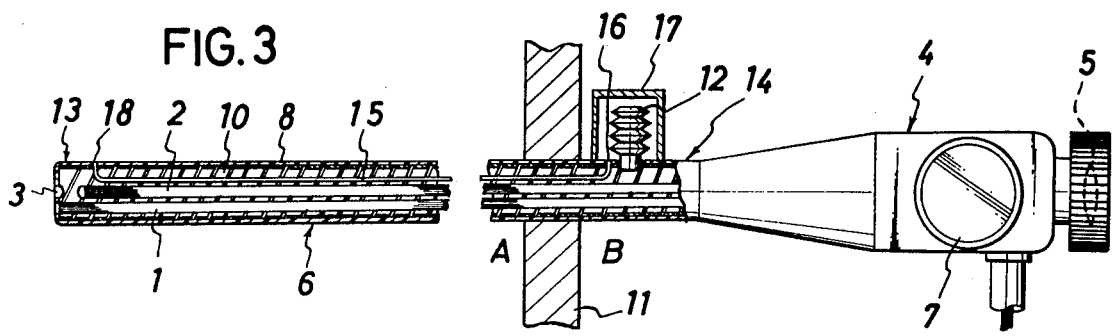
FIG. 3 is a cross-sectional view of a pressure-tight endoscope according to further embodiment of the present invention.

FIG. 3 illustrates a further embodiment of the present invention. A pipe 15 is provided for transmitting the high-pressure which is applied on a tip portion 13 to a rearward portion 14. A rearward aperture 16 of the pipe 15 and the bellows 12 nearby is housed within a pressure-tight hermetic vessel 17. This embodiment is applicable even if the bellows 12 cannot be inserted into the high-pressure place (A). A gas which is pressed into the pipe 15 via a tip aperture 18 compresses the bellows 12 in the hermetic vessel 17. Accordingly, air in the bellows 12 presses the cover 8 from the inner side and consequently, the inner and exterior pressures on the endoscope are balanced, and the deformation of it can be prevented.

Figure 4:
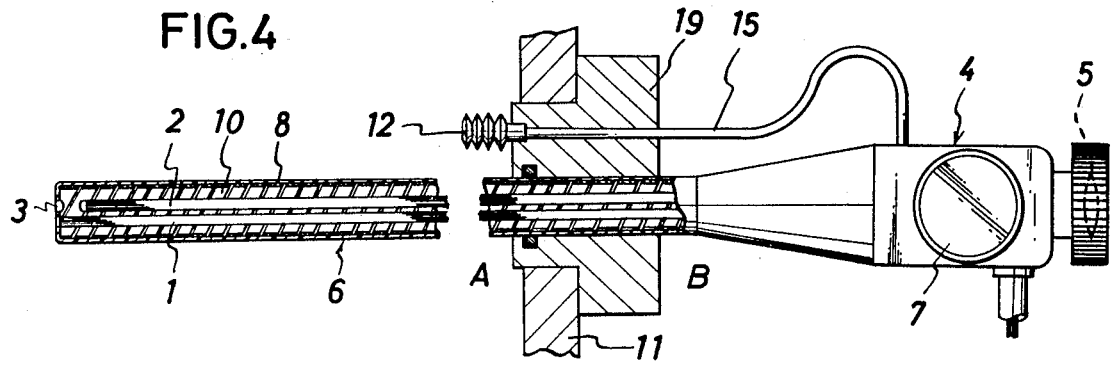
FIG. 4 is a cross-sectional view of a pressure-tight endoscope accroding to other embodiment of the present invention.

FIG. 4 shows other embodiment of the present invention. An insert 19 is slidably attached to the circumference of the endoscope. The bellows 12 is provided on the insert 19 and the pipe 15 makes an air communication between the bellows 12 and the grip portion 4. The insert 19 may be fitted to a cock of a pressurized gas tank. The interior pressure which is applied on the inner portion 10 via the bellows 12 and the pipe 15 is balanced with the exterior pressure.

By the above-described pressure-tight endoscope, the high-pressure which bears on to the exterior surface of the endoscope is led into the inner side, accordingly, the inner and exterior pressures are balanced, thereby, deformation of the endoscope due to the high-pressure or a breakage of the hermetic construction or difficulty in operating of the flexible sheath can be prevented.

While there have been shown and described and pointed out the fundamental novel features of the invention as applied to preferred embodiments, it will be understood, however, that the various omissions and substitutions and changes in the form and details may be made by those skilled in the art without departing from the spirit of the invention.

What is claimed is:

1. A pressure-tight hermetically sealed endoscope comprising a fiber optic bundle and a sheath covering said fiber optic bundle, an inner cavity portion formed within said sheath, said sheath adapted to be placed in a region of high pressure, a first aperture in air communication with said inner cavity, a bellows connected with said first aperture to transfer pressure acting on said bellows to said first aperture to pressurize the inner cavity portion of said sheath to equalize the pressure acting on the interior walls and the exterior walls of said sheath, said bellows being in air communication with said region of high pressure.

2. The endoscope of claim 1, wherein said first aperture is located in said sheath and said bellows is directly connected to said first aperture, said bellows and first aperture being located within said region of high pressure.

3. The endoscope of claim 1, wherein first aperture and said bellows are in a hermetically sealed compartment located outside the region of high pressure further comprising a second aperture located in said sheath in said region of high pressure, and an air pipe connected between said second aperture and said compartment to carry said high pressure to act on said bellows.

4. The endoscope of claim 1, wherein the endoscope comprises a grip end and said first aperture is located in said grip end, said bellows being located in said region of high pressure, and an air pipe connected between said bellows and said first aperture.

* * * * *